US011447000B2

(12) United States Patent
Yoshida (10) Patent No.: US 11,447,000 B2
(45) Date of Patent: Sep. 20, 2022

(54) COATING DEVICE FOR ANTI-VIBRATION MOUNT AND METHOD FOR COATING ANTI-VIBRATION MOUNT

(71) Applicant: TOYO TIRE CORPORATION, Itami (JP)

(72) Inventor: Hiroyuki Yoshida, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 446 days.

(21) Appl. No.: 16/697,299

(22) Filed: Nov. 27, 2019

(65) Prior Publication Data

US 2020/0171930 A1 Jun. 4, 2020

(30) Foreign Application Priority Data

Dec. 4, 2018 (JP) .............................. JP2018-227451

(51) Int. Cl.
*F16F 13/06* (2006.01)
*B05C 13/02* (2006.01)
(Continued)

(52) U.S. Cl.
CPC ........ *B60K 5/1208* (2013.01); *B05B 13/0228* (2013.01); *B05C 5/02* (2013.01);
(Continued)

(58) Field of Classification Search
CPC .. F16F 13/06; F16F 13/08; F16F 13/10; F16F 13/103; F16F 2226/02; F16F 2226/04;
(Continued)

(56) References Cited

U.S. PATENT DOCUMENTS 6,763,552 B1 7/2004 Kitamura et al.
2010/0308524 A1 12/2010 Kitaura et al.
(Continued)

FOREIGN PATENT DOCUMENTS

CN 1369043 A 9/2002
CN 201483253 U 5/2010
(Continued)

OTHER PUBLICATIONS

Office Action dated Dec. 28, 2020, issued in counterpart CN Application No. 2019112138923.7, with English translation (17 pages).

*Primary Examiner* — Thomas J Williams
(74) *Attorney, Agent, or Firm* — WHDA, LLP (57) ABSTRACT

A coating device for anti-vibration mounts coating a first fitting of each of a first and a second anti-vibration mounts respectively including the first fitting appearing on an outer surface of a first end portion in a longitudinal direction and a second fitting attached to a second end portion includes a coating spray that coats the first fitting and a mount support portion that supports the first and the second anti-vibration mounts on the second attachment fitting side. The first anti-vibration mount has an outer circumference protrusion portion that protrudes from the circumference of the second fitting. The second anti-vibration mount has a fitting protrusion portion that is the second fitting itself protruding. The mount support portion has a pair of supporting wall portions that support the outer circumference protrusion portion from both sides and a recess portion into which the fitting protrusion portion fits.

6 Claims, 11 Drawing Sheets

(51) Int. Cl.
  *B05B 13/02* (2006.01)
  *B60K 5/12* (2006.01)
  *B05C 5/02* (2006.01)
  *F16F 13/10* (2006.01)

(52) U.S. Cl.
  CPC ............ *F16F 13/06* (2013.01); *F16F 13/103* (2013.01); *B05C 13/02* (2013.01)

(58) Field of Classification Search
  CPC . B05C 13/02; B05B 13/0228; B05B 13/0285; B60K 5/1208; B60K 5/1225
  See application file for complete search history.

(56) References Cited

U.S. PATENT DOCUMENTS

| | | | |
|---|---|---|---|
| 2015/0123327 A1* | 5/2015 | Saito | F16F 13/08 267/140.13 |
| 2016/0369864 A1* | 12/2016 | Kubota | F16F 13/10 |
| 2018/0134136 A1 | 5/2018 | Ikawa et al. | |
| 2018/0134137 A1* | 5/2018 | Ikawa | F16F 1/36 |
| 2018/0172108 A1* | 6/2018 | Ikawa | F16F 13/085 |
| 2020/0171930 A1* | 6/2020 | Yoshida | B60K 5/1225 |

FOREIGN PATENT DOCUMENTS

| | | | | |
|---|---|---|---|---|
| CN | 101925439 A | | 12/2010 | |
| CN | 108071726 A | | 5/2018 | |
| JP | 2003-329079 A | | 11/2003 | |
| JP | 2015124785 A | * | 7/2015 | |
| JP | 2015171751 A | * | 10/2015 | ............... G04C 3/08 |

\* cited by examiner

A-arrow view

B-arrow view

Enlarged view of X portion

Enlarged view of Y portion

COATING DEVICE FOR ANTI-VIBRATION MOUNT AND METHOD FOR COATING ANTI-VIBRATION MOUNT

CROSS-REFERENCE TO RELATED APPLICATIONS

This application claims priority of Japanese Patent Application No.: 2018-227451 filed on Dec. 4, 2018, the content of which is incorporated herein by reference.

BACKGROUND OF THE INVENTION

Technical Field

The present invention relates to a coating device for an anti-vibration mount and a method for coating an anti-vibration mount.

Related Art

An anti-vibration mount (such as a liquid-sealed engine mount for example) is interposed between a vibration source and a support member that supports the vibration source, and is configured to elastically support the vibration source with respect to the support member. Generally, the anti-vibration mount includes a metal attachment fitting, and is attached to the vibration source and the support member via the attachment fitting. The attachment fitting may be coated by a coating device for rust prevention (for example, JP2003-329079).

According to the coating device disclosed in JP2003-329079, a mount support portion that supports the anti-vibration mount in an upright state to be rotatable about an axis thereof is provided, and coating is performed, by a coating unit (for example, a brush or a coating spray), on the anti-vibration mount, supported by the mount support portion and rotating. The mount support portion has a positioning unit for supporting the anti-vibration mount in a state in which the anti-vibration mount is kept in a fixed distance with respect to the coating unit and is prevented from rotating in a rotation direction.

SUMMARY

There are various types (models) of anti-vibration mounts having different anti-vibration characteristics depending on required performance. In addition, the anti-vibration mount may be of different types with different shapes depending on the shape of the counterpart to which the anti-vibration mount is attached. Thus, in a coating device that uses anti-vibration mounts different from each other in the shape of a portion to be supported by the mount support portion, dedicated mount support portions are provided for positioning the respective anti-vibration mounts with different shapes.

As a result, when anti-vibration mounts having different shapes are produced on a mixed flow production line, the coating device requires set-up change to use the dedicated mount support portion for the anti-vibration mount to be produced. This means that the production line is stopped every time the set-up change is performed, resulting in a low productivity in the coating device.

An object of the present invention is to provide a coating device for an anti-vibration mount and a method for performing coating on an anti-vibration mount that enable the productivity in the coating device to be improved in a case where a plurality of types of anti-vibration mounts are produced on a mixed flow line.

The present invention provides a coating device for anti-vibration mounts, the coating device coating a first fitting of each of the anti-vibration mounts respectively including the first fitting appearing on an outer surface of a first end portion of a rubber member in a longitudinal direction thereof and a second fitting attached to a second end portion, the anti-vibration mount as a target of coating including an anti-vibration mount of a first type having, in the second end portion, an outer circumference protrusion portion protruding in the longitudinal direction from a circumference of the second fitting and an anti-vibration mount of a second type having, in the second end portion, a fitting protrusion portion that is the second fitting itself protruding in the longitudinal direction, the coating device including: a coating unit that coats the first fitting; and a mount support portion that supports the anti-vibration mount on a side of the second end portion, in which the mount support portion includes a pair of supporting wall portions that sandwich and support the outer circumference protrusion portion from both sides in a direction orthogonal to the longitudinal direction, and a recess portion into which the fitting protrusion portion fits, the recess portion being recessed in the longitudinal direction.

According to the present invention, in the anti-vibration mount of the first type, the outer circumference protrusion portion is supported by the pair of supporting wall portions of the mount support portion. On the other hand, in the anti-vibration mount of the second type, the fitting protrusion portion is fitted into the recess portion of the mount support portion. Thus, the anti-vibration mount of the first type and the anti-vibration mount of the second type can be supported by the common mount support portion, despite the difference in configuration on the second end portion side. With this configuration, the coating device for anti-vibration mounts can coat the first fittings of the two different types of anti-vibration mounts without the need for set-up change in the mount support portion, whereby improved productivity can be achieved.

In addition, since a dedicated mount support portion needs not to be individually provided for each of the anti-vibration mount of the first type and the anti-vibration mount of the second type, the number of types of the mount support portion used can be reduced and thus the cost required for manufacturing the mount support portion can be reduced.

Preferably, the outer circumference protrusion portion has a notch that is open on a side of the second end portion, and a guide pin that engages with the notch is provided between the pair of supporting wall portions.

With this configuration, the guide pin engages with the notch in the state where the anti-vibration mount of the first type is supported by the mount support portion, whereby the positioning (or the rotation stop) for the anti-vibration mount of the first type in the rotation direction with respect to the mount support portion is achieved. Thus, in performing coating with the mount support portion being rotated, the anti-vibration mount of the first type can be stably rotated together with the mount support portion, and thus the anti-vibration mount of the first type can be coated evenly.

Preferably, the outer circumference protrusion portion has an outer surface formed of a rubber member, and a gap between the outer circumference protrusion portion and the pair of supporting wall portions is larger than a gap between the fitting protrusion portion and the recess portion.

With this configuration, with the outer surface formed of a rubber member, the outer circumference protrusion portion is likely to have a relatively large frictional resistance on the surface. Thus, the gap between the corresponding pair of supporting wall portions and the outer circumference protrusion portion is set to be relatively large, so that the contact with the outer circumference protrusion portion is suppressed. This contributes to ensuring easy assembling of the outer circumference protrusion portion. Furthermore, the outer circumference protrusion portion located on the outer circumference side of the anti-vibration mount of the first type is supported by the pair of supporting wall portions, whereby rattling is likely to be suppressed even when the gap therebetween is relatively large.

Meanwhile, with the outer surface formed of metal, the fitting protrusion portion has a relatively small frictional resistance on the surface. This contributes to ensuring easy assembling of the fitting protrusion portion even when the gap between the corresponding recess portion and the fitting protrusion portion is set to be relatively small. Furthermore, with the gap therebetween set to be relatively small, the anti-vibration mount of the second type can be supported on the mount support portion while suppressing rattling.

Thus, the gap is set to be relatively large for the outer circumference protrusion portion, which is positioned on the outer side where the rattling is relatively less likely to be large, and the gap is set to be relatively small for the fitting protrusion portion, which is positioned on the inner side where the rattling is relatively likely to be large. The outer circumference protrusion portion, for which the gap is set to be large, can have the outer surface formed of a rubber member. The fitting protrusion portion, for which the gap is set to be small, can have the outer surface formed of metal.

Preferably, the fitting protrusion portion is formed to have a non-circular shape as viewed in the longitudinal direction.

With this configuration, the fitting protrusion portion having a non-circular shape and the recess portion are fitted to each other in the state where the anti-vibration mount of the second type is supported by the mount support portion, whereby the positioning (or the rotation stop) for the anti-vibration mount of the second type in the rotation direction with respect to the mount support portion is achieved. Thus, in coating while rotating the mount support portion, the anti-vibration mount of the second type can be rotated together with the mount support portion, and thus the anti-vibration mount of the second type can be coated evenly.

Preferably, as viewed in the longitudinal direction, the fitting protrusion portion is formed to be elongated in a first direction, and includes a pair of arc portions facing each other in the first direction and a pair of flat portions facing each other in a second direction orthogonal to the first direction, and a gap, in the second direction, between the fitting protrusion portion and the recess portion is smaller than a gap in the first direction.

With this configuration, when viewed in the longitudinal direction, the flat portions are disposed along the second direction and the arc portions are disposed in the first direction, and the gap between the recess portion and the fitting protrusion portion in the second direction is set to be smaller than the gap in the first direction. Thus, the rattling of the fitting protrusion portion with respect to the recess portion is more effectively suppressed.

Another aspect of the present invention provides a method for coating an anti-vibration mount, the method including coating the second fitting of each of the anti-vibration mount of the first type and the anti-vibration mount of the second type, by using the coating device for an anti-vibration mount described in any one of the above.

According to the present invention, productivity in the coating device can be improved in a case where a plurality of types of anti-vibration mounts are produced on a mixed flow line.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Embodiments according to the present invention will be described below with reference to the accompanying drawings. Note that the following description is substantially a mere example and is not intended to limit the present invention, applicable objects thereof, and use thereof. Furthermore, the drawings are schematic, and the ratio among dimensions is different from the actual ones.

Figure 1A:
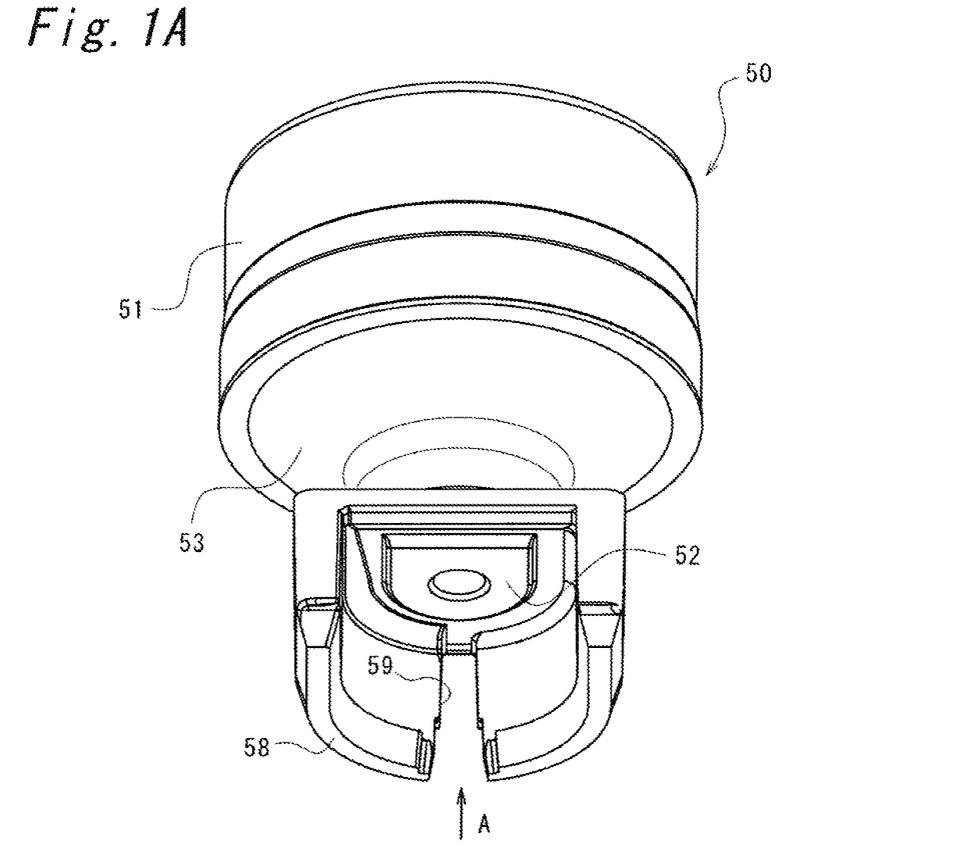
FIGS. 1A and 1B show a first anti-vibration mount.
Figure 1B:
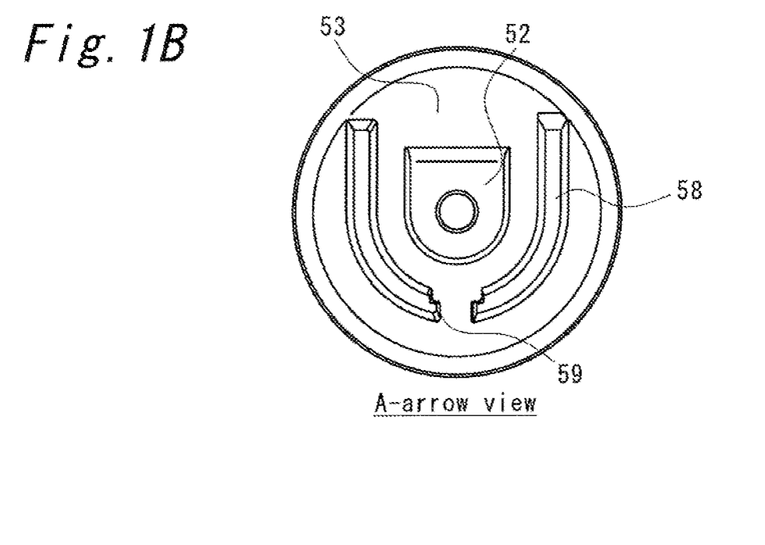

FIG. 1 shows an anti-vibration mount 50 of a first type (hereinafter referred to as a first anti-vibration mount 50) as an exemplary anti-vibration mount. The first anti-vibration mount 50 is interposed between an engine and a vehicle body frame (that are not shown), and elastically supports the engine with respect to the vehicle body frame.

As shown in FIG. 1A, the first anti-vibration mount 50 includes an elastic base body 53 made of a vertically elongated rubber member, a first attachment fitting 51 provided to the first end portion of the elastic base body 53 in a longitudinal direction (an upper end portion in FIG. 1A), and a second attachment fitting 52 provided to the second end portion (lower end portion). The first attachment fitting 51 is a metal cylindrical member, and is attached to an outer circumference portion of the upper end portion of the elastic base body 53 by caulking. The first attachment fitting 51 is attached to the vehicle body frame.

Figure 2:
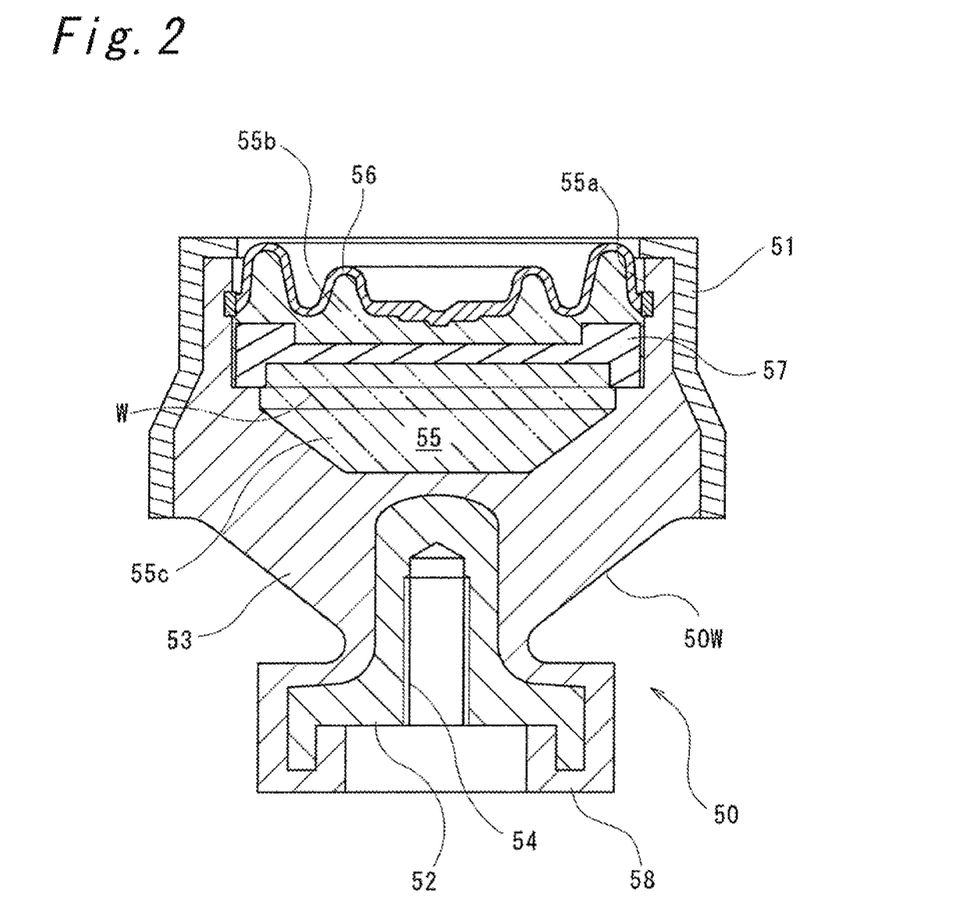
FIG. 2 is a longitudinal sectional view of the first anti-vibration mount.

FIG. 2 is a vertical cross-sectional view of the first anti-vibration mount. Referring also to FIG. 2, the second attachment fitting 52 is bonded by vulcanization so as to be included inside the lower portion of the elastic base body 53, and only has the lower end surface exposed downward from the elastic base body 53. The second attachment fitting 52 is provided with a female threaded portion 54 extending in a vertical direction, and is attached to the engine with a bolt (not shown) tightened into the female threaded portion 54.

Inside the upper end portion of the elastic base body 53, a liquid chamber 55 opened upward is defined. An opening 55a at the upper end of the liquid chamber 55 is provided with a diaphragm 56.

The liquid chamber 55 is hermetically sealed by the diaphragm 56, so that liquid such as water, ethylene glycol, or silicone oil is sealed in the liquid chamber 55. The liquid chamber 55 is vertically partitioned into an upper first chamber 55b and a lower second chamber 55c by a partition member 57. The chambers communicate with each other through an orifice flow passage (not shown) formed in the partition member 57. Thus, the liquid sealed in the liquid chamber 55 is configured to be able to flow between the first chamber 55b and the second chamber 55c.

FIG. 1B is an A-arrow view (bottom view) showing the first anti-vibration mount 50 as viewed in a direction indicated by an arrow A in FIG. 1A. Referring also to FIG. 1B, the first anti-vibration mount 50 is formed, around the second attachment fitting 52, with an outer circumference protrusion portion 58 protruding toward the second end portion side in the longitudinal direction (downward in FIG. 1). The outer circumference protrusion portion 58 is formed in a U shape in FIG. 1B.

The outer circumference protrusion portion 58A is formed, at a bottom portion of the U shape, with a notch 59 penetrating from the outer side to the inner side of the U shape. The notch 59 is formed over the height of the outer circumference protrusion portion 58. In other words, the outer circumference protrusion portion 58 is divided to be on both sides of the notch 59. The outer circumference protrusion portion 58 has a tip formed in a chamfered shape to be tapered toward the second end portion side in the longitudinal direction.

As shown in FIG. 2, the outer circumference protrusion portion 58 has the second attachment fitting 52 serving a core material, and the outer circumference portion of the core material is covered with the elastic base body 53 bonded by vulcanization. Therefore, the outer surface of the outer circumference protrusion portion 58 is formed of a rubber member.

Figure 3A:
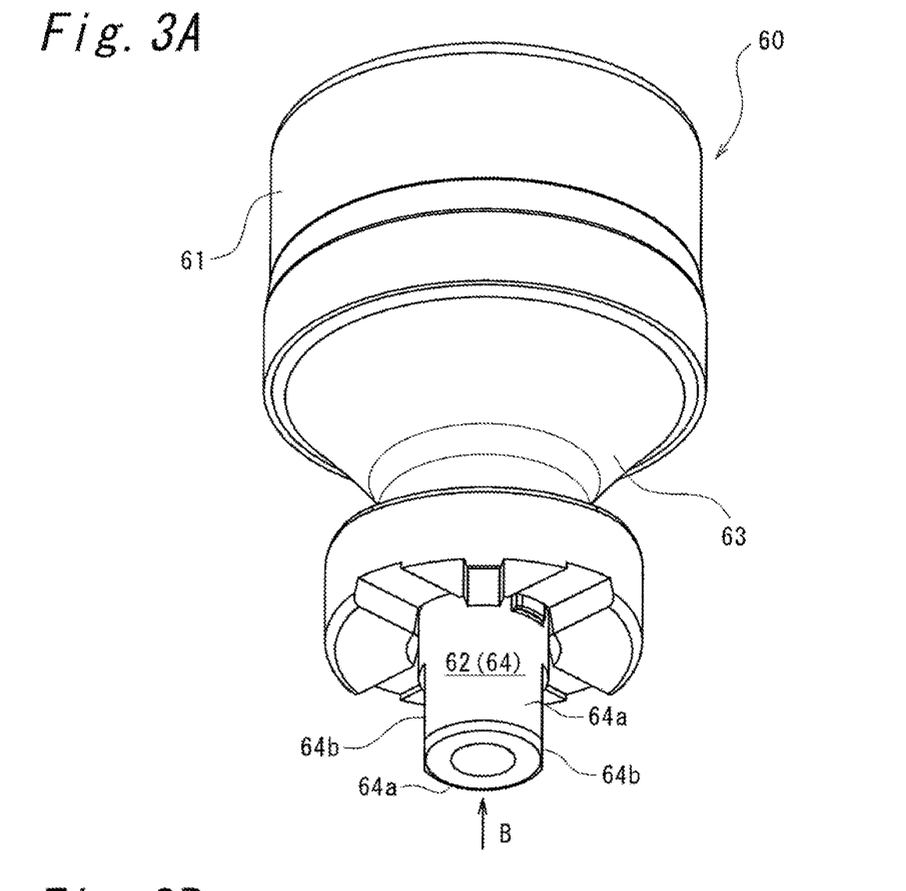
FIGS. 3A and 3B show a second anti-vibration mount.
Figure 3B:
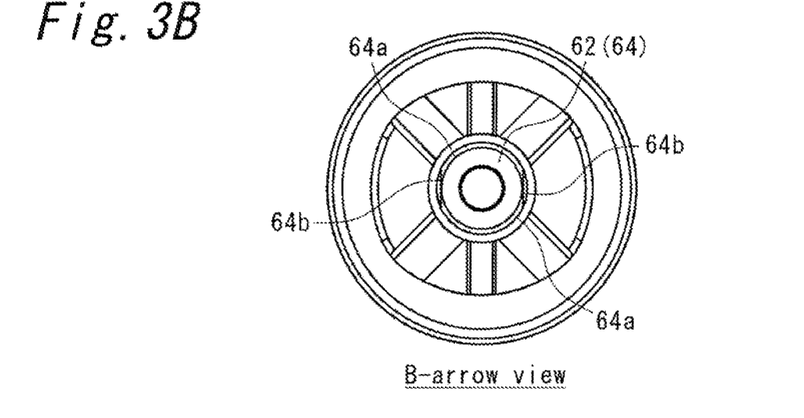

FIG. 3 shows an anti-vibration mount 60 of a second type (hereinafter referred to as a second anti-vibration mount 60) as another exemplary anti-vibration mount. Similarly to the first anti-vibration mount 50, the second anti-vibration mount 60 is interposed between the engine and the vehicle body frame (that are not shown), and elastically supports the engine with respect to the vehicle body frame. The second anti-vibration mount 60 includes an elastic base body 63 extending in the longitudinal direction, a first attachment fitting 61 provided at the first end portion of the elastic base body 63 in the longitudinal direction, and a second attachment fitting 62 provided at the second end portion.

The second anti-vibration mount 60 is different from the first anti-vibration mount 50 in that the second attachment fitting 62 protrudes downward from the elastic base body 63. The second attachment fitting 62 itself protrudes downward from the elastic base body 63 to form a fitting protrusion portion 64 at the lower end portion of the second anti-vibration mount 60. Thus, the fitting protrusion portion 64 is not covered with a rubber member, and has the outer surface formed of metal.

The fitting protrusion portion 64 is a cylindrical rod-like member extending in the longitudinal direction, and has a substantially half portion on the second end portion side processed to have width across flats in a direction orthogonal to an extending direction. Specifically, the fitting protrusion portion 64 includes a pair of arc portions 64a in a radial direction and a pair of flat portions 64b in the radial direction that are the portion processed to have width across flats and connect the pair of arc portions 64a to each other.

Figure 4A:
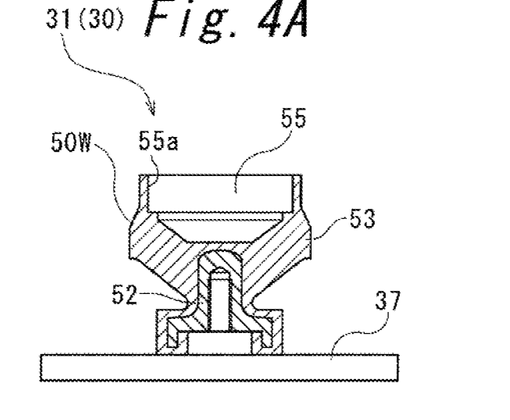
FIGS. 4A to 4F are explanatory views showing an assembly process of the anti-vibration mount.

Next, a production line for producing the first anti-vibration mount 50 will be described. First of all, an assembly line 30 for the first anti-vibration mount 50 will be described with reference to FIG. 4. In a mount workpiece placing step 31 shown in FIG. 4A, a mount workpiece 50W in which the second attachment fitting 52 is vulcanized to the elastic base body 53 is prepared, and the mount workpiece 50W is placed on an assembly table 37 while being oriented to have the opening 55a of the liquid chamber 55 facing upward.

Figure 4B:
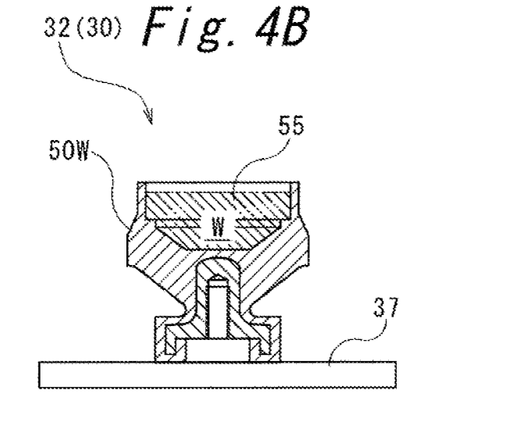
Figure 4C:
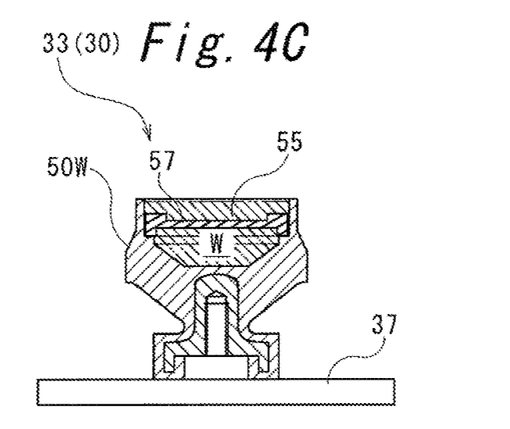
Figure 4D:
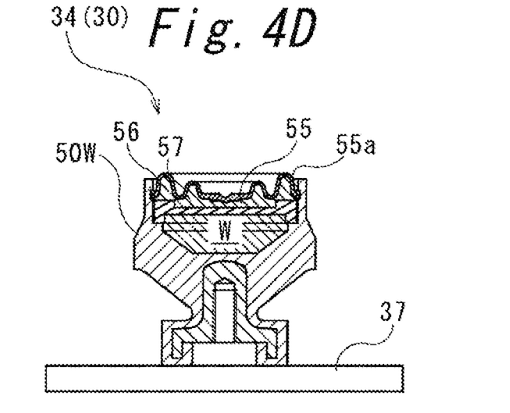

Next, in a liquid putting step 32 shown in FIG. 4B, a predetermined amount of liquid W is put into the liquid chamber 55. Then, in a partition member mounting step 33 shown in FIG. 4C, the partition member 57 is provided in the liquid chamber 55. Furthermore, in a diaphragm mounting step 34 shown in FIG. 4D, the diaphragm 56 is mounted to the opening 55a of the liquid chamber 55.

Figure 4E:
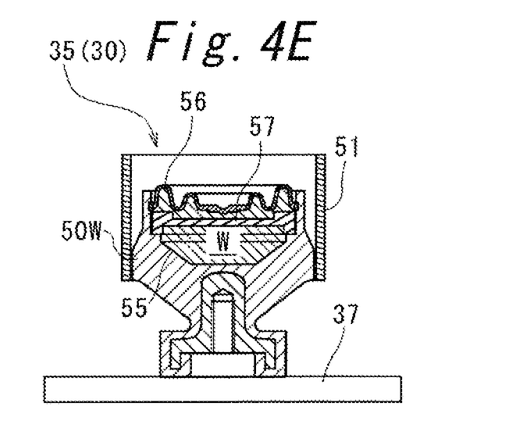
Figure 4F:
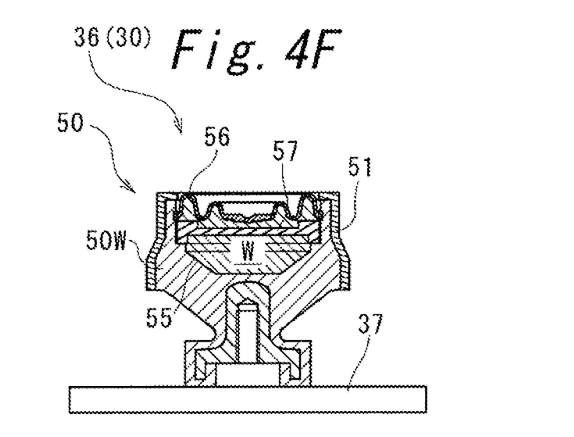

Next, in a first attachment fitting mounting step shown in FIG. 4E, the first attachment fitting 51 is fitted on the outer circumference of the upper end portion of the mount workpiece 50W. Finally, in a liquid-chamber sealing step 36 shown in FIG. 4F, the first attachment fitting 51 is caulked inward in the radial direction so that the liquid W is sealed in the liquid chamber 55 with the diaphragm 56 fixed at the opening 55a of the liquid chamber 55. Thus, the first anti-vibration mount 50 is assembled.

Figure 5A:
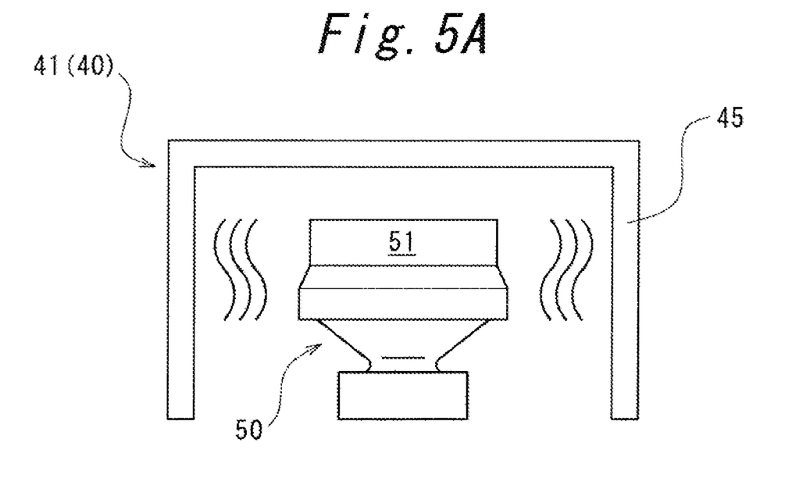
FIGS. 5A to 5C are explanatory views showing a coating process of the anti-vibration mount.

Next, a coating line 40 for performing coating on the outer surface of the first attachment fitting 51 of the first anti-vibration mount 50 will be described with reference to FIG. 5. In a preheating step 41 shown in FIG. 5A, the first attachment fitting 51 of the first anti-vibration mount 50 is preheated by an oven 45. With the preheating performed, the a coating material applied in the subsequent step can be quickly dried.

Figure 5B:
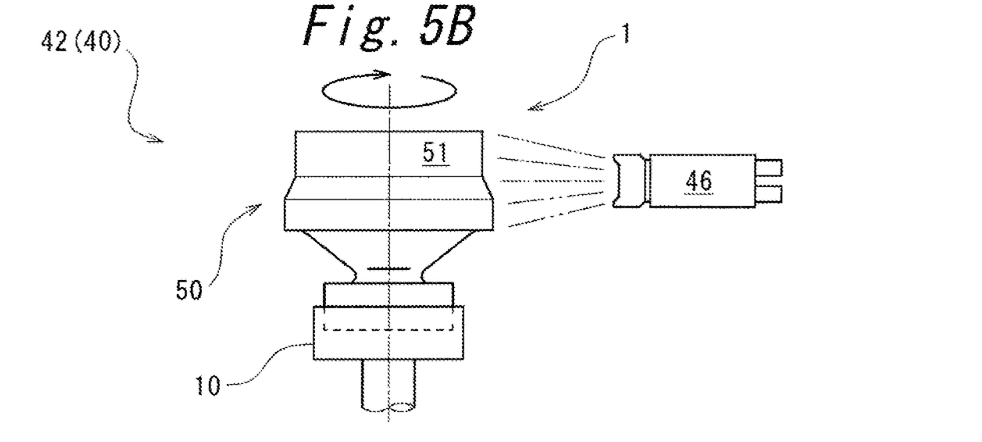

For the next, coating material application step 42 shown in FIG. 5B, a coating device 1 having a mount support portion 10 for supporting the first anti-vibration mount 50 and a coating spray 46 (coating unit) is provided. The mount support portion 10 supports the first anti-vibration mount 50 from below in such a manner that the first attachment fitting 51 is positioned on the upper side with the longitudinal direction matching the vertical direction, and is configured to rotate about the center axis of the first anti-vibration mount 50 extending in the longitudinal direction. The coating spray 46 sprays and applies the coating material to the first anti-vibration mount 50 that is supported and rotated by the mount support portion 10.

Figure 5C:
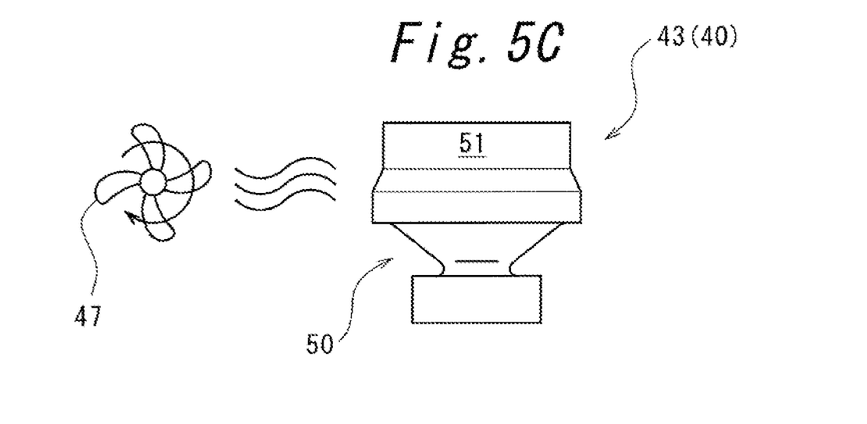

Finally, in a coating material drying step 43 shown in FIG. 5C, the first anti-vibration mount 50 is supplied with air from a blower 47, to facilitate the drying of the coating material applied to the first attachment fitting 51. Thus, the first anti-vibration mount 50 is produced.

The above description is given with the first anti-vibration mount 50 as an example. It should be noted that the second anti-vibration mount 60 is produced in the same manner. Furthermore, the assembly line 30 and the coating line 40 are configured as a mixed flow line on which not only the first anti-vibration mount 50 but also the second anti-vibration mount 60 is produced.

The mount support portion 10 of the coating device 1 will be described below in detail. The mount support portion 10 is configured to be capable of supporting the first and the second anti-vibration mounts 50 and 60 at the second attachment fittings 52 and 62 with different shapes without the need for set-up change.

Figure 6:
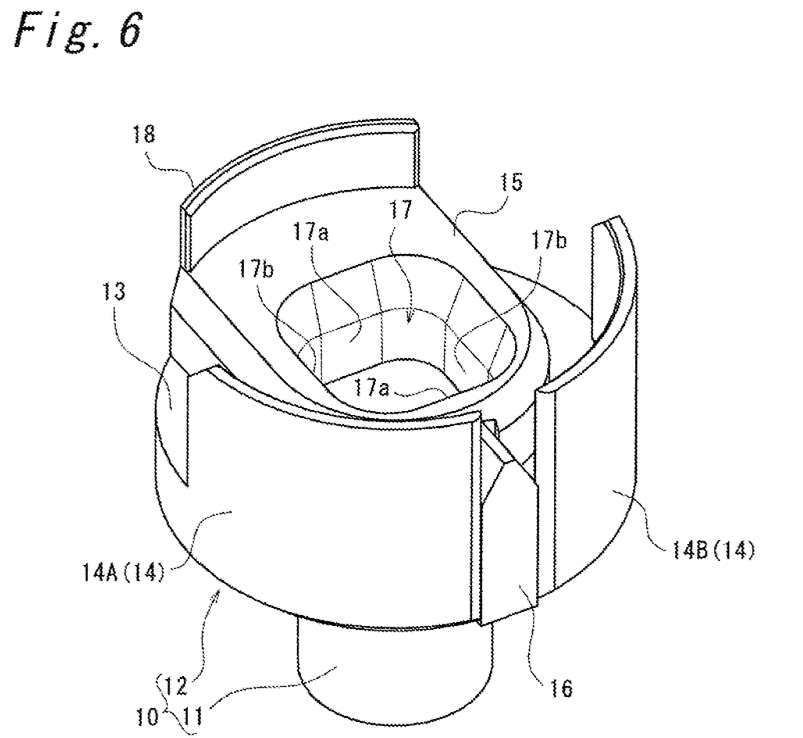
FIG. 6 is a perspective view of the mount support portion as viewed from above.

FIG. 6 is a perspective view showing the mount support portion 10. As shown in FIG. 6, the mount support portion 10 has a rotating rod 11 extending in the vertical direction, and a support portion 12 fixed to the upper end portion of the rotating rod 11. The rotating rod 11 is configured to be rotatable about an axis by a rotation unit not shown (such as a motor for example).

The support portion 12 includes a disc-shaped base body 13, an outer circumference wall portion 14 extending upward along the circumference edge of the base body 13, and a center protrusion portion 15 protruding upward from the base body 13 on the inner side of the outer circumference wall portion 14.

Figure 7:
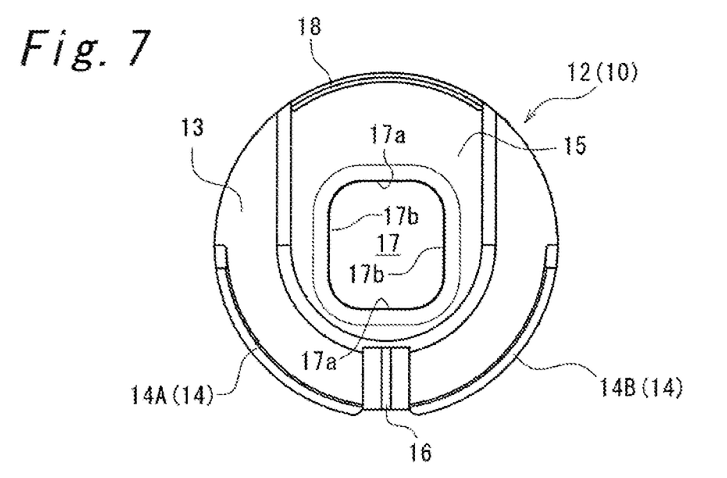
FIG. 7 is a top view of the mount support portion.

As shown in FIG. 7, in the top view, the outer circumference wall portion 14 is formed in an arc shape corresponding to the half circumference of the circumference edge of the base body 13, and is divided into a first outer circumference wall portion 14A and a second outer circumference wall portion 14B positioned on both sides of an intermediate position in an extending direction of the arc shape. A guide pin 16 extending upward is provided between the first outer circumference wall portion 14A and the second outer circumference wall portion 14B.

The guide pin 16 extends from the portion between the first outer circumference wall portion 14A and the second outer circumference wall portion 14B, inward in the radial direction of the base body 13 to reach a side surface of the center protrusion portion 15. The top portion of the guide pin 16 is chamfered so as to be tapered upward.

In the top view, the center protrusion portion 15 extends from the center portion of the base body 13 in the radial direction to the circumference edge of the base body located on the side opposite to the guide pin 16. A portion of the outer circumference edge on the upper surface of the center protrusion portion 15, excluding the end portion on the side opposite to the guide pin 16, is chamfered.

The center protrusion portion 15A is formed on the upper surface thereof with a recess portion 17 recessed downward. The recess portion 17 is located at the center portion of the base body 13 in the radial direction, and is formed in a rectangular shape that is elongated in the extending direction of the center protrusion portion 15 in the top view, and has corners R provided at the four corners. The opening edge at the upper end of the recess portion 17 is chamfered over the entire circumference. The recess portion 17 has a pair of longitudinal direction end surfaces 17a facing each other in the longitudinal direction and a pair of lateral direction end surfaces 17b facing each other in the lateral direction.

The center protrusion portion 15 is formed, at an end portion thereof, with a third outer circumference wall portion 18 that extends upward along the circumference edge of the base body 13 on the side opposite to the guide pin 16. The first to the third outer circumference wall portions 14A, 14B, and 18 are formed to have top portions at the same height, and the top portions are chamfered radially inward in the radial direction of the base body 13.

Here, the first and the second outer circumference wall portions 14A and 14B and the center protrusion portion are formed corresponding to the outer circumference protrusion portion 58 of the first anti-vibration mount 50. On the other hand, the recess portion 17 is formed corresponding to the fitting protrusion portion 64 of the second anti-vibration mount 60. Thus, the first and the second anti-vibration mounts 50 and 60 can be supported with respect to the common mount support portion 10.

Figure 8:
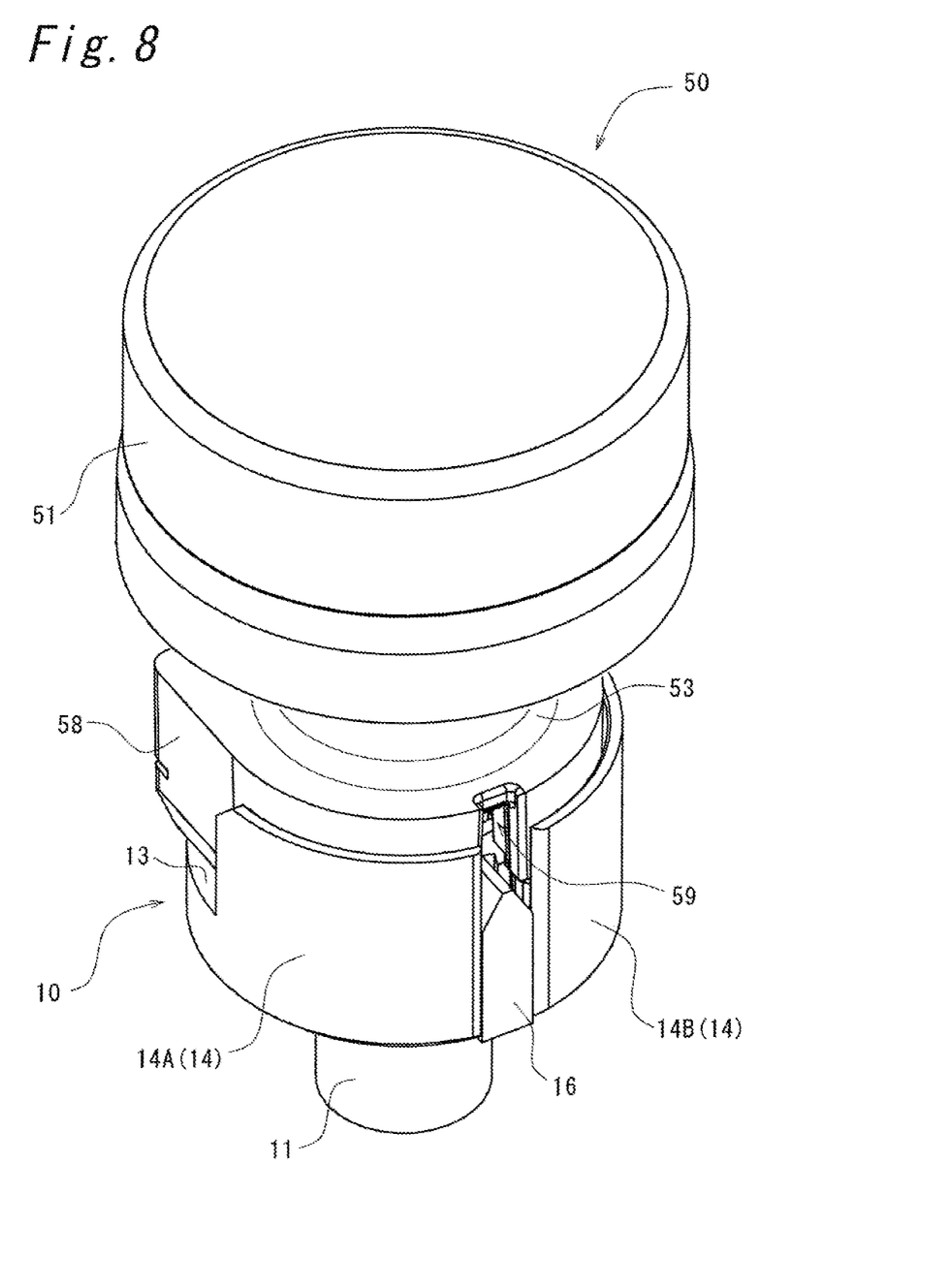
FIG. 8 is a perspective view showing the first anti-vibration mount supported by the mount support portion.

FIG. 8 shows a state in which the first anti-vibration mount 50 is supported by the mount support portion 10. As shown in FIG. 8, in a state where the first anti-vibration mount 50 is supported by the mount support portion 10, the outer circumference protrusion portion 58 is supported in the radial direction by the first and the second outer circumference wall portions 14A and 14B, and the guide pin 16 is engaged with the notch 59 formed in the outer circumference protrusion portion 58 from below. Furthermore, the lower end portion of the outer circumference protrusion portion 58 is seated on the upper surface of the base body 13.

Figure 9:
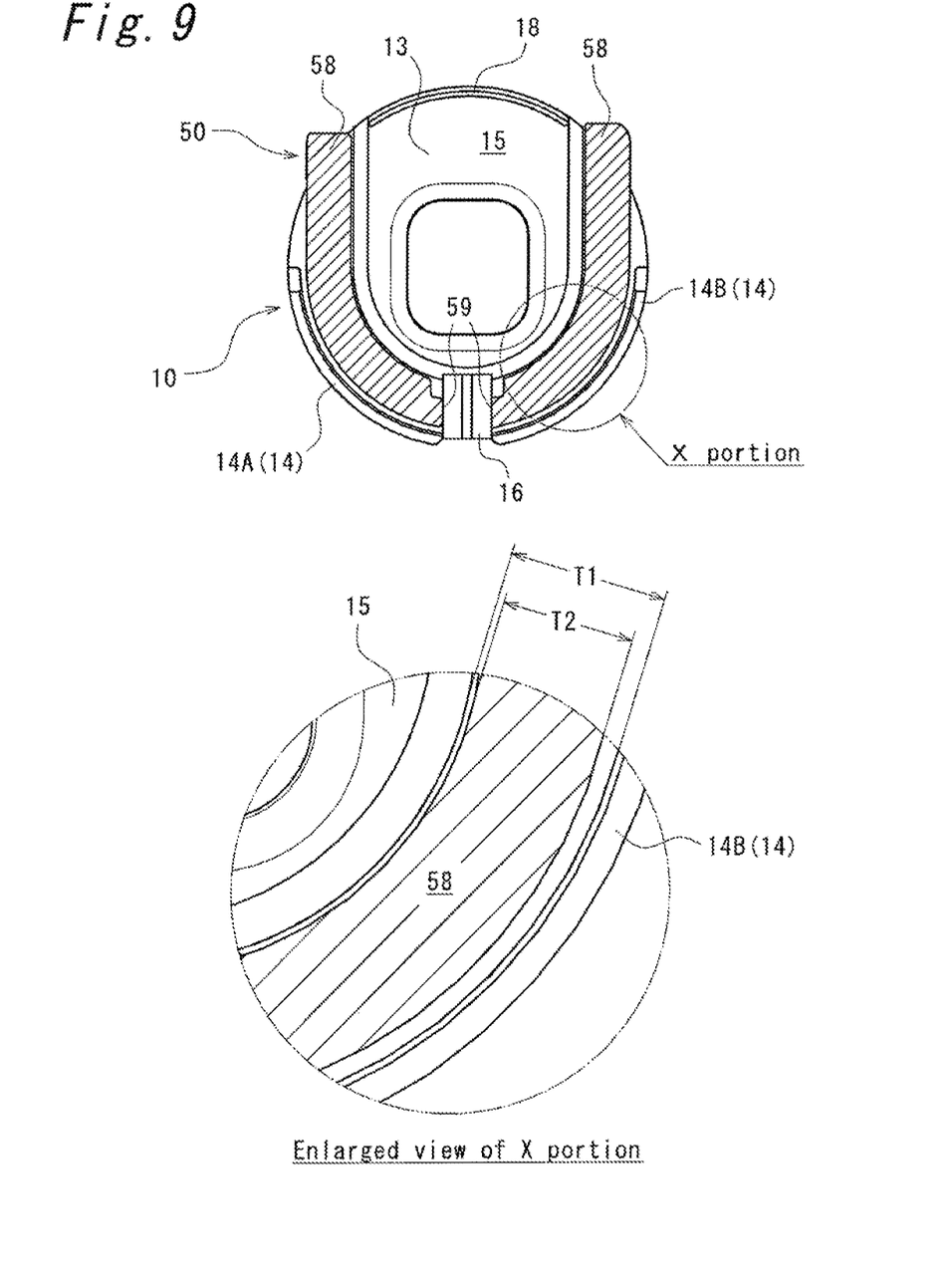
FIG. 9 is a top view showing an outer circumference protrusion portion of the first anti-vibration mount supported by the mount support portion.

FIG. 9 is a lateral cross-sectional view of the outer circumference protrusion portion 58 of the first anti-vibration mount 50 with respect to the top view of the mount support portion 10. As shown in FIG. 9, in the top view, the inner walls of the first and the second outer circumference wall portions 14A and 14B are formed along the outer wall of the outer circumference protrusion portion 58, and the outer wall of the center protrusion portion 15 is formed along the inner wall of the outer circumference protrusion portion 58. Thus, the first and the second outer circumference wall portions 14A and 14B and the center protrusion portion 15 form a pair of supporting wall portions that support the outer circumference protrusion portion 58 from both inner and outer wall sides.

Furthermore, as shown in an enlarged view of a portion X in FIG. 9, a gap T1 between the first and the second outer circumference wall portions 14A and 14B and the center protrusion portion 15 is formed to be larger than a thickness T2 of the outer circumference protrusion portion 58. Thus, the outer circumference protrusion portion 58 can be inserted between the first and the second outer circumference wall portions 14A and 14B and the center protrusion portion 15 from above. Note that a difference between the gap T1 and the thickness T2 in total, that is, including both the gap on the side of the first and second outer circumference wall portions 14A and 14B and the gap on the side of the center protrusion portion 15, is set to approximately 1 mm.

Thus, the first anti-vibration mount 50 is supported by the mount support portion 10 while a rotation stop in the rotation direction is achieved, with the outer circumference protrusion portion 58 inserted between the first and the second outer circumference wall portions 14A and 14B and the center protrusion portion 15 from above, and with the guide pin 16 engaged with the notch 59 formed in the outer circumference protrusion portion 58. Furthermore, the first and the second outer circumference wall portions 14A and 14B prevent the first anti-vibration mount 50 from falling off due to the centrifugal force acting when the rotating rod 11 is being rotated.

Note that the third outer circumference wall portion 18 is located on the inner side of the opening side of the U shape of the outer circumference protrusion portion 58, in the state where the first anti-vibration mount 50 is supported by the mount support portion 10.

Figure 10:
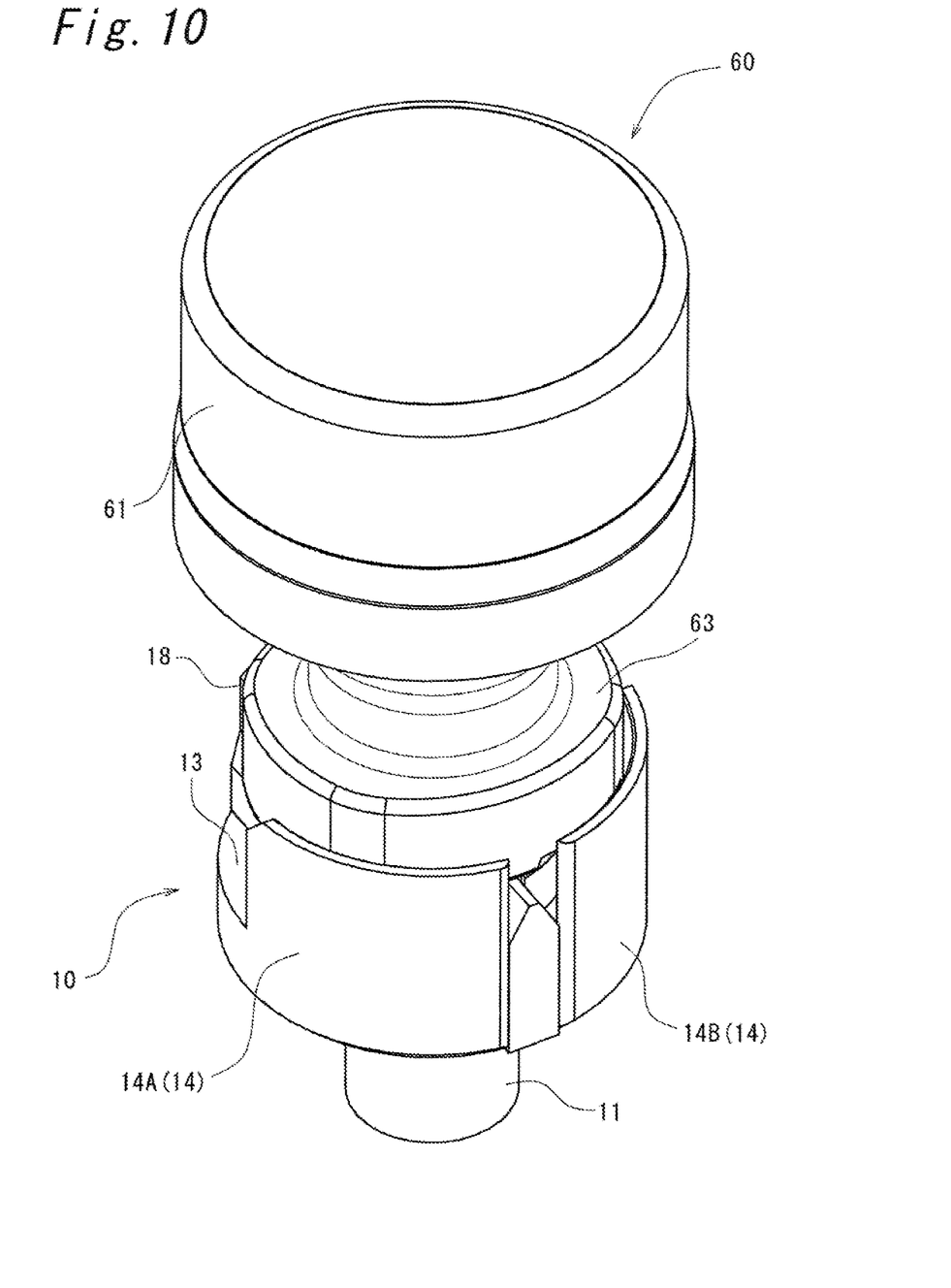
FIG. 10 is a perspective view showing a second anti-vibration mount supported by the mount support portion.

FIG. 10 shows a state in which the second anti-vibration mount 60 is supported by the mount support portion 10. As shown in FIG. 10, the second anti-vibration mount 60 is supported by the mount support portion 10, and the lower portion of the elastic base body 63 is supported by the first to the third outer circumference wall portions 14A, 14B, and 18 in the radial direction. Although not elaborated in the figure, the lower end portion of the fitting protrusion portion 64 is seated on the bottom portion of the recess portion 17.

Figure 11:
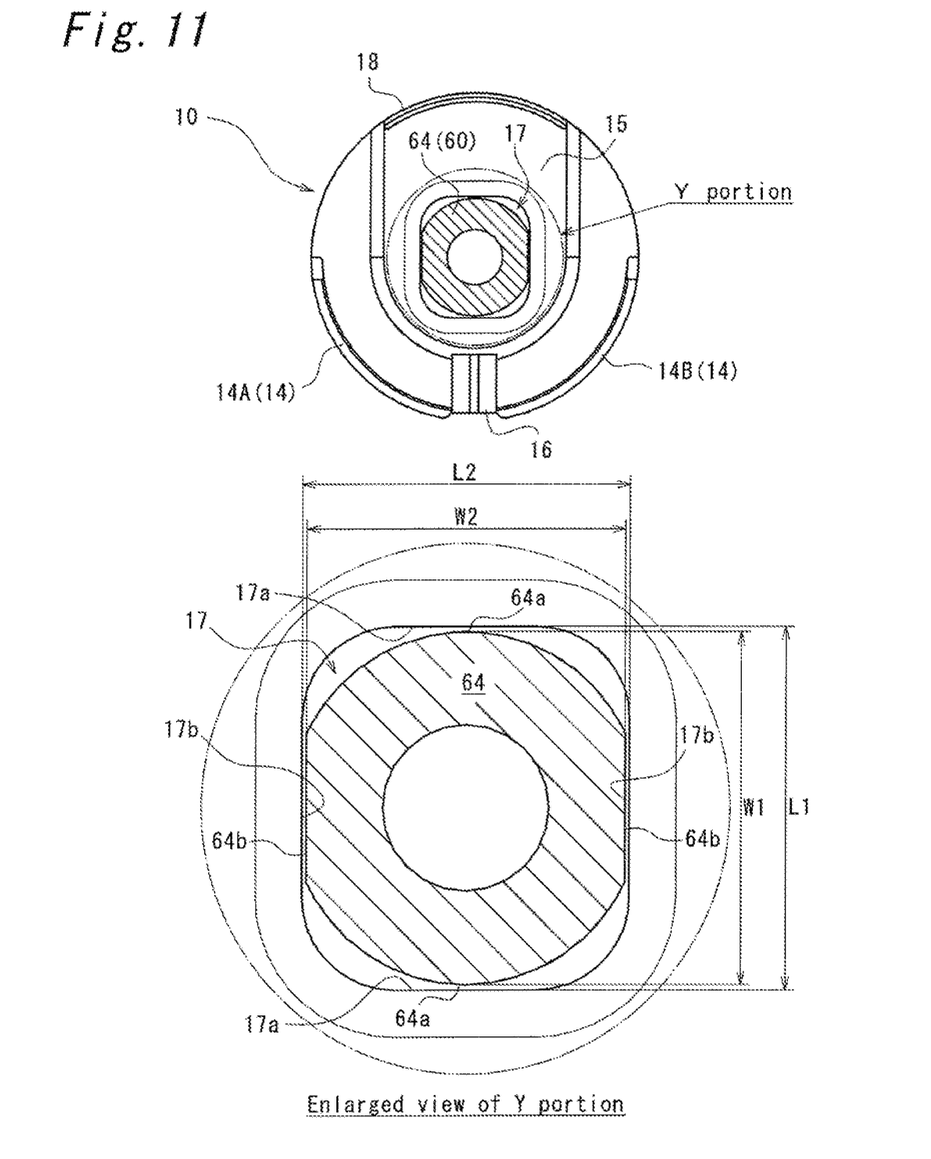
FIG. 11 is a top view showing a fitting protrusion portion of the second anti-vibration mount supported by the mount support portion.

FIG. 11 is a lateral cross-sectional view of the fitting protrusion portion 64 of the second anti-vibration mount 60, with respect to the top view of the mount support portion 10. As shown in FIG. 11, the fitting protrusion portion 64 is fitted on the inner side of the recess portion 17 in a top view.

Specifically, as shown in an enlarged view of a portion Y in FIG. 11, the fitting protrusion portion 64 that has been processed to have width across flats is fitted in the recess portion 17, with the longitudinal direction matching the longitudinal direction of the recess portion 17 in the top view. Thus, the pair of arc portions 64a of the fitting protrusion portion 64 are positioned to face the pair of respective longitudinal direction end surfaces 17a of the recess portion 17, and the pair of flat portions 64b of the fitting protrusion portion 64 are positioned to face the pair of respective lateral direction end surfaces 17b.

A play (gap) between the recess portion 17 and the fitting protrusion portion 64 is set to be shorter in the lateral direction than in the longitudinal direction. For example, a difference between a length L1 between the pair of longitudinal direction end surfaces 17a of the recess portion 17 and an outer width W1 between the pair of arc portions 64a of the fitting protrusion portion 64 (that is, the outer diameter of the arc portion 64a) is set to 0.4 mm or more and 0.6 mm or less. A difference between a length L2 between the pair of lateral direction end surfaces 17b of the recess portion 17 and an outer width W2 between the pair of flat portions 64b of the fitting protrusion portion 64 is set to 0.2 mm or less.

Thus, the second anti-vibration mount 60 is supported by the mount support portion 10 while the rotation stop in the rotational direction is achieved, with the fitting protrusion portion 64 fitted in the recess portion 17. Furthermore, the first to the third outer circumference wall portions 14A, 14B, and 18 prevent the second anti-vibration mount 60 from falling off due to the centrifugal force acting when the rotating rod 11 is being rotated.

With the coating device 1 including the mount support portion 10 described above, the following effects can be obtained.

(1) In the first anti-vibration mount 50, the outer circumference protrusion portion 58 is supported by the first and the second outer circumference wall portions 14A and 14B and the center protrusion portion 15 of the mount support portion 10. On the other hand, in the second anti-vibration mount 60, the fitting protrusion portion 64 is fitted in the recess portion 17 of the mount support portion 10. Thus, the first anti-vibration mount 50 and the second anti-vibration mount 60 can be supported by the common mount support portion 10, despite the difference in configuration between the second attachment fittings 52 and 62. With this configuration, in the coating device 1 for an anti-vibration mount, coating can be performed on the first fittings 51 and 61 of the first and the second anti-vibration mounts 50 and 60 without the need for set-up change in the mount support portion 10, whereby improved productivity can be achieved.

(2) Since the mount support portion 10 needs not to be individually provided for each of the first and the second anti-vibration mounts 50 and 60, the number of types of the mount support portion 10 used can be reduced and thus the cost required for manufacturing the mount support portion 10 can be reduced.

(3) The guide pin 16 engages with the notch 59 in the state where the first anti-vibration mount 50 is supported by the mount support portion 10, whereby the positioning (or the rotation stop) for the first anti-vibration mount 50 in the rotation direction with respect to the mount support portion 10 is achieved. Thus, in performing coating with the mount support portion 10 being rotated, the first anti-vibration mount 50 can be stably rotated together with the mount support portion 10, and thus the first anti-vibration mount 50 can be coated evenly.

(4) With the outer surface formed of a rubber member, the outer circumference protrusion portion 58 is likely to have a relatively large frictional resistance on the surface. Thus, the gap T1 between the corresponding first and second outer circumference wall portions 14A and 14B and the center protrusion portion 15 is set to be relatively large, so that the contact with the outer circumference protrusion portion 58 is suppressed. This contributes to ensuring easy assembling of the outer circumference protrusion portion 58. Furthermore, the outer circumference protrusion portion 58 located on the outer circumference side of the first anti-vibration mount 50 is supported by the first and the second outer circumference wall portions 14A and 14B and the center protrusion portion 15, whereby rattling is likely to be suppressed even when the gap therebetween is relatively large.

Meanwhile, with the outer surface formed of metal, the fitting protrusion portion 64 has a relatively small frictional resistance on the surface. This contributes to ensuring easy assembling of the fitting protrusion portion 64 even when the gap between the corresponding recess portion and the fitting protrusion portion 64 is set to be relatively small. Furthermore, with the gap therebetween set to be relatively small, the second anti-vibration mount 60 can be supported on the mount support portion 10 while suppressing rattling.

Thus, the gap is set to be relatively large for the outer circumference protrusion portion 58, which is positioned on the outer side where the rattling is relatively less likely to be large, and the gap is set to be relatively small for the fitting protrusion portion 64, which is positioned on the inner side where the rattling is relatively likely to be large. The outer circumference protrusion portion 58, for which the gap is set to be large, can have the outer surface formed of a rubber member. The fitting protrusion portion, for which the gap is set to be small, can have the outer surface formed of metal.

(5) The fitting protrusion portion 64 having a non-circular shape and the recess portion 17 are fitted to each other in the state where the second anti-vibration mount 60 is supported by the mount support portion 10, whereby the positioning (or the rotation stop) for the second anti-vibration mount 60 in the rotation direction with respect to the mount support portion 10 can be achieved. Thus, in coating while rotating the mount support portion 10, the second anti-vibration mount 60 can be rotated together with the mount support portion 10, and thus the second anti-vibration mount can be coated evenly.

(6) When viewed from above, the arc portions 64a of the fitting protrusion portion 64 are positioned corresponding to the longitudinal direction end surfaces 17a of the recess portion 17, and the flat portions 64b of the fitting protrusion portion 64 are positioned corresponding to the lateral direction end surfaces 17b. Furthermore, the gap between the recess portion 17 and the fitting protrusion portion 64 in the lateral direction is set to be smaller than the gap in the longitudinal direction. Thus, the rattling of the fitting protrusion portion 64 with respect to the recess portion 17 is more effectively suppressed.

In the embodiment described above, the liquid-sealed anti-vibration mount, in which the liquid is sealed in the liquid chamber, has been described as an example, but the present invention is not limited to this. Specifically, the present invention can also be applied to coating on an attachment fitting of a mount member with no liquid sealed therein.

In the embodiment described above, the first and the second anti-vibration mounts 50 and 60 have been described as an example, in which the first attachment fittings 51 and 61 have substantially the same shape, and the second attachment fittings 52 and 62 have different shapes. However, the present invention is not limited to this. Specifically, as long as the second attachment fittings 52 and 62 are configured to have the shapes described in the embodiment described above, the present invention can be applied to the first and the second anti-vibration mounts with the first attachment fittings 51 and 61 having different shapes.

Note that the present invention is not limited to the configurations described in the embodiment described above, and can be modified in various ways.

What is claimed is:

1. A coating device for coating an anti-vibration mount that comprises a rubber member having a first end portion and a second end portion, a first fitting appearing on an outer surface of the first end portion in a longitudinal direction of the anti-vibration mount and a second fitting attached to the second end portion, the anti-vibration mount being one of anti-vibration mounts comprising an anti-vibration mount of a first type that has, in the second end portion, an outer circumference protrusion portion protruding in the longitudinal direction from a circumference of the second fitting and an anti-vibration mount of a second type that has, in the second end portion, a fitting protrusion portion that is the second fitting itself protruding in the longitudinal direction, the coating device comprising:
    a coating unit that coats the first fitting; and
    a mount support portion that supports the anti-vibration mount on a side of the second end portion, wherein the mount support portion includes:
    a pair of supporting wall portions configured to support the anti-vibration mount of the first type in such a manner as to comprise an outer circumference wall portion that supports the outer circumference protrusion portion from an outer side of the outer circumference wall portion and a center protrusion portion that positions on an inner side of the outer circumference wall portion and supports the outer circumference protrusion portion from the inner side in a direction orthogonal to the longitudinal direction; and
    a recess portion configured to support the anti-vibration mount of the second type in such a manner as to be recessed in the center protrusion portion in the longitudinal direction for the fitting protrusion portion fitting into the recess portion.

2. The coating device according to claim 1, wherein the outer circumference protrusion portion has a notch that is open on a side of the second end portion, and
    a guide pin that engages with the notch is provided between the pair of supporting wall portions.

3. The coating device according to claim 1, wherein the outer circumference protrusion portion has an outer surface formed of a rubber member, and
    a gap between the outer circumference protrusion portion and the pair of supporting wall portions is larger than a gap between the fitting protrusion portion and the recess portion.

4. The coating device according to claim 1, wherein the fitting protrusion portion is formed to have a non-circular shape as viewed in the longitudinal direction.

5. The coating device according to claim 1, wherein as viewed in the longitudinal direction, the fitting protrusion portion is formed to be elongated in a first direction, and includes a pair of arc portions facing each other in the first direction and a pair of flat portions facing each other in a second direction orthogonal to the first direction, and
    a gap, in the second direction, between the fitting protrusion portion and the recess portion is smaller than a gap in the first direction.

6. A method for coating an anti-vibration mount that comprises a rubber member having a first end portion and a second end portion, a first fitting appearing on an outer surface of the first end portion in a longitudinal direction of the anti-vibration mount and a second fitting attached to the second end portion, the anti-vibration mount being one of anti-vibration mounts comprising an anti-vibration mount of a first type that has, in the second end portion, an outer circumference protrusion portion protruding in the longitudinal direction from a circumference of the second fitting and an anti-vibration mount of a second type that has, in the second end portion, a fitting protrusion portion that is the second fitting itself protruding in the longitudinal direction, the method comprising:
    coating the first fitting by using a coating device that comprises:
    a coating unit that coats the first fitting; and
    a mount support portion that supports the anti-vibration mount on a side of the second end portion, wherein the mount support portion includes:
    a pair of supporting wall portions configured to support the anti-vibration mount of the first type in such a manner as to comprise an outer circumference wall portion that supports the outer circumference protrusion portion from an outer side of the outer circumference wall portion and a center protrusion portion that positions on an inner side of the outer circumference wall portion and supports the outer circumference protrusion portion from the inner side in a direction orthogonal to the longitudinal direction; and
    a recess portion configured to support the anti-vibration mount of the second type in such a manner as to be recessed in the center protrusion portion in the longitudinal direction for the fitting protrusion portion fitting into the recess portion.

* * * * *